United States Patent
Menéndez-Pidal et al.

(10) Patent No.: US 6,768,979 B1
(45) Date of Patent: Jul. 27, 2004

(54) APPARATUS AND METHOD FOR NOISE ATTENUATION IN A SPEECH RECOGNITION SYSTEM

(75) Inventors: Xavier Menéndez-Pidal, Los Gatos, CA (US); Miyuki Tanaka, Tokyo (JP); Ruxin Chen, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/282,809

(22) Filed: Mar. 31, 1999

Related U.S. Application Data

(63) Continuation-in-part of application No. 09/177,461, filed on Oct. 22, 1998.
(60) Provisional application No. 60/121,678, filed on Feb. 25, 1999.

(51) Int. Cl.[7] ............................................. G10L 21/02
(52) U.S. Cl. ......................................................... 704/226
(58) Field of Search ................................ 704/226–228, 704/233, 234; 381/94.1, 94.2

(56) References Cited

U.S. PATENT DOCUMENTS

| | | | |
|---|---|---|---|
| 4,592,085 A | | 5/1986 | Watari et al. .................. 381/43 |
| 5,003,601 A | | 3/1991 | Watari et al. .................. 381/43 |
| 5,204,874 A | * | 4/1993 | Falconer et al. ............. 375/130 |
| 5,319,736 A | * | 6/1994 | Hunt ............................ 704/227 |
| 5,390,278 A | | 2/1995 | Gupta et al. ................ 395/2.52 |
| 5,513,298 A | | 4/1996 | Stanford et al. ............ 395/2.52 |
| 5,604,839 A | * | 2/1997 | Acero et al. ................. 704/234 |
| 5,615,296 A | | 3/1997 | Stanford et al. .............. 395/2.1 |
| 5,621,859 A | | 4/1997 | Schwartz et al. ........... 395/2.65 |
| 5,715,367 A | | 2/1998 | Gillick et al. ............... 395/2.63 |
| 5,742,694 A | * | 4/1998 | Eatwell ...................... 381/94.2 |
| 5,991,718 A | * | 11/1999 | Malah ........................ 704/226 |
| 6,098,040 A | * | 8/2000 | Petroni et al. .............. 704/234 |
| 6,173,258 B1 | * | 1/2001 | Menendez-Pidal et al. . 704/226 |

OTHER PUBLICATIONS

Mischa Schwartz, Information Transmission, Modulation, and Noise, 1959, McGraw–Hill Book Company, Inc., pp. 362–373.*

O'Shaughnessy, Douglas, "Speech Communcation, Human and Machine," 1990, pp. 422–23.

Proakis, John and Dimitris Manolakis, "Digital Signal Processing," 1992, pp. 706–08.

Milner, Ben & Saeed Vaseghi, "Analysis of Cepstral–Time Matrices for Noise and Channel Robust Speech Recognition," 1995, pp. 519–22, ESCA EUROSPEECH'95.

Davis, Steven & Paul Mermelstein, "Comparison of Parametric Representations for Monosyllabic Word Recognition in Continuously Spoken Sentences," pp. 353–60, IEEE Trans on ASSP, No. 4, Aug. 1980.

(List continued on next page.)

*Primary Examiner*—David D. Knepper
(74) *Attorney, Agent, or Firm*—Gregory J. Koerner; Simon & Koerner LLP

(57) ABSTRACT

The noise suppressor utilizes statistical characteristics of the noise signal to attenuate amplitude values of the noisy speech signal that have a probability of containing noise. In one embodiment, the noise suppressor utilizes an attenuation function having a shape determined in part by a noise average and a noise standard deviation. In a further embodiment, the noise suppressor also utilizes an adaptive attenuation coefficient that depends on signal-to-noise conditions in the speech recognition system.

39 Claims, 10 Drawing Sheets

OTHER PUBLICATIONS

Iwahashi, N. et al., "Stochastic Features for Noise Robust Speech Recognition," IEEE 1998, pp. 633–36.

Neumeyer, Leonardo et al., "Training Issues and Channel Equalization Techniques for the Construction of Telephone Acoustic Models Using a High–Quality Speech Corpus," pp. 590–97, IEEE Trans on Speech and Audio Processing, vol. 2, No. 4, Oct. 1994.

Tibrewala, Sangita & Hynek Hermansky, "Multi–Band and Adaptation Approaches to Robust Speech Recognitoin," 1997, pp. 2619–22, ESCA Eurospeech 97, Rhodes, Greece.

Nolazco Flores, J.A. & S.J. Young, "Adapting a HMM–Based Recognizer for Noisy Speech Enhanced by Spectral Subtraction," 1993, pp. 1–30.

Hanson, Brian et al., Speech Technology Laboratory, Panasonic Technologies, Inc., "Spectral Dynamics for Speech Recognition under Adverse Conditions," pp. 331–356, 1997.

Viikki, Olli & Kari Laurilla, Nokia Research Center and Audio System Laboratory, "Noise Robust HMM–Based Speech Recognition Using Segmental Cepstral Feature Vector Normalization," pp. 1–4, Apr. 17–18, 1997.*

Chen, Ruxin et al., Sony Research Laboratories, "A Parameter Sharing, Discrete and Continuous HMM Unified, Speech Recognition System," Oct. 28, 1997.*

Milner, Ben, Speech Technology Unit, BT Laboratories, Martiesham Health,"Inclusion of Temporal Information into Features For Speech Recogntion," pp. 256–259, 1996.*

* cited by examiner

APPARATUS AND METHOD FOR NOISE ATTENUATION IN A SPEECH RECOGNITION SYSTEM

CROSS-REFERENCE TO RELATED APPLICATIONS

This application is a continuation-in-part of co-pending U.S. application Ser. No. 09/177,461, entitled "Method For Reducing Noise Distortions In A Speech Recognition System," filed Oct. 22, 1998. This application is also related to, and claims the benefit of, U.S. Provisional Application No. 60/121,678, entitled "Adaptive Non-Linear Noise Attenuation For Speech Recognition And Speech Enhancement Applications," filed Feb. 25, 1999. These related applications are commonly assigned.

BACKGROUND OF THE INVENTION

1. Field of the Invention

This invention relates generally to electronic speech recognition systems and relates more particularly to an apparatus and method for noise attenuation in a speech recognition system.

2. Description of the Background Art

Implementing an effective and efficient method for system users to interface with electronic devices is a significant consideration of system designers and manufacturers. Automatic speech recognition is one promising technique that allows a system user to effectively communicate with selected electronic devices, such as digital computer systems. Speech typically consists of one or more spoken utterances which each may include a single word or a series of closely-spaced words forming a phrase or a sentence.

Conditions with significant ambient background noise levels present additional difficulties when implementing a speech recognition system. Examples of such noisy conditions may include speech recognition in automobiles or in certain manufacturing facilities. To accurately analyze a particular utterance in such user applications, a speech recognition system may be required to selectively differentiate between a spoken utterance and the ambient background noise.

Referring now to FIG. 1(a), an exemplary waveform diagram for one embodiment of noisy speech 112 is shown. In addition, FIG. 1(b) depicts an exemplary waveform diagram for one embodiment of speech 114 without noise. Similarly, FIG. 1(c) shows an exemplary waveform diagram for one embodiment of noise 116 without speech 114. In practice, noisy speech 112 of FIG. 1(a) therefore is typically comprised of several components, including speech 114 of FIG. (1(b) and noise 116 of FIG. 1(c). In FIGS. 1(a), 1(b), and 1(c), waveforms 112, 114, and 116 are presented for purposes of illustration only. The present invention may readily incorporate various other embodiments of noisy speech 112, speech 114, and noise 116.

The two main sources that typically create acoustic distortion are the presence of additive noise (such as car noise, music or background speakers), and convolutive distortions due to the use of various different microphones, use of a telephone channel, or reverberation effects. Different types of additive noise will have different signal characteristics. A speech recognition system designed to reduce one type of additive noise may not be robust to other types of additive noise, thereby reducing the effectiveness of the system.

From the foregoing discussion, it therefore becomes apparent that noise attenuation in a speech recognition system is a significant consideration of system designers and manufacturers of speech recognition systems.

SUMMARY OF THE INVENTION

In accordance with the present invention, an apparatus and method are disclosed for noise attenuation in a speech recognition system. The invention includes a noise suppressor configured to attenuate noise in a noisy speech signal, and a processor coupled to the system to control the noise suppressor. The noise suppressor utilizes statistical characteristics of the noise signal to attenuate amplitude values of the noisy speech signal that have a probability of containing noise.

In one embodiment, a Fast Fourier transformer generates amplitude energy values for the noisy speech signal in units of frames. The Fast Fourier transformer also generates amplitude energy values for a noise signal in units of frames. The amplitude energy values may be magnitude energy values or power energy values.

The noise suppressor preferably utilizes an attenuation function having a shape determined in part by a noise average and a noise standard deviation. The shape of the attenuation function as the function increases is an inverse of the shape of a probability density curve of a noise signal. The noise average determines where the attenuation function begins to increase from a maximum attenuation level, which is determined by an attenuation coefficient. The noise standard deviation determines the shape of the attenuation function as the function increases from the maximum attenuation level to unity, or full transmission.

In a further embodiment, the noise suppressor also utilizes an adaptive attenuation coefficient that depends on signal-to-noise conditions in the speech recognition system. The adaptive attenuation coefficient will typically be larger for high noise conditions, and smaller for low noise conditions. The adaptive attenuation coefficient also depends on frequency because noise typically does not affect the speech signal equally at all frequencies.

The noise suppressor of the present invention provides attenuated noisy speech energy to a filter bank. The filter bank filters the attenuated noisy speech energy into channel energy, and then provides the channel energy to a logarithmic compressor to be converted to logarithmic channel energy. A frequency cosine transformer then converts the logarithmic channel energy into corresponding static features that are separately provided to a normalizer, a first time cosine transformer, and a second time cosine transformer.

The first time cosine transformer converts the static features into delta features that are provided to the normalizer. Similarly, the second time cosine transformer converts the static features into delta-delta features that are also provided to the normalizer. The normalizer performs a normalization procedure on the static features to generate normalized static features to a recognizer. The normalizer also performs a normalization procedure on the delta features and delta-delta features to generate normalized delta features and normalized delta-delta features, respectively, to the recognizer.

The recognizer analyzes the normalized static features, the normalized delta features, and the normalized delta-delta features to generate a speech recognition result, according to the present invention. The present invention thus efficiently and effectively implements an apparatus and method for noise attenuation in a speech recognition system.

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a noise suppressor configured to attenuate noise in a noisy speech signal in an electronic system, and a processor coupled to the system to control the noise suppressor. The noise suppressor utilizes statistical characteristics of a noise signal to attenuate amplitude values of the noisy speech signal that have a probability of containing noise. In one embodiment, the noise suppressor utilizes an attenuation function having a shape determined in part by a noise average and a noise standard deviation. In a further embodiment, the noise suppressor also utilizes an adaptive attenuation coefficient that depends on signal-to-noise conditions in the speech recognition system.

Figure 1:
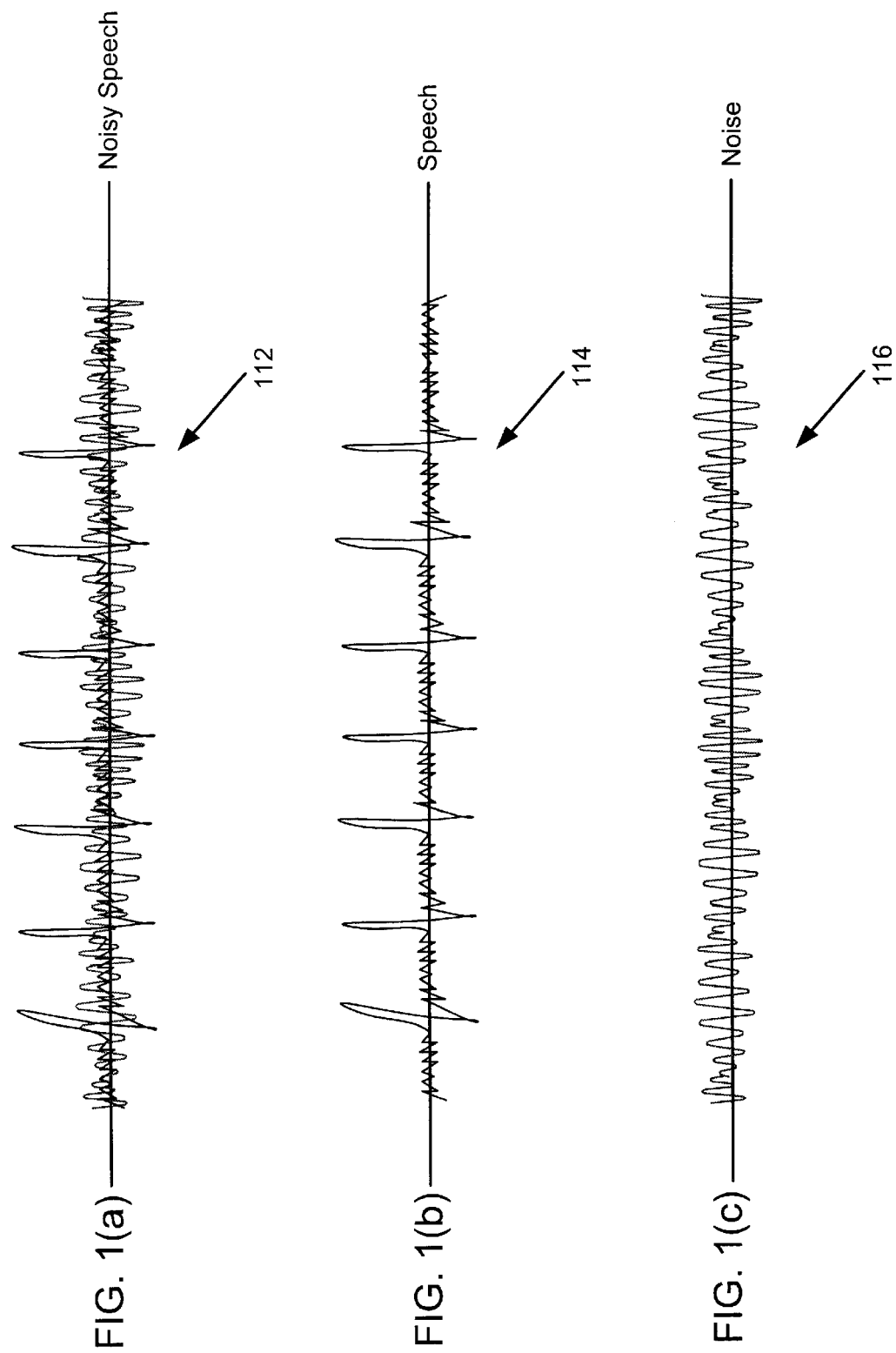
FIG. 1(a) is an exemplary waveform diagram for one embodiment of noisy speech.
FIG. 1(b) is an exemplary waveform diagram for one embodiment of speech without noise.
FIG. 1(c) is an exemplary waveform diagram for one embodiment of noise without speech.
Figure 2:
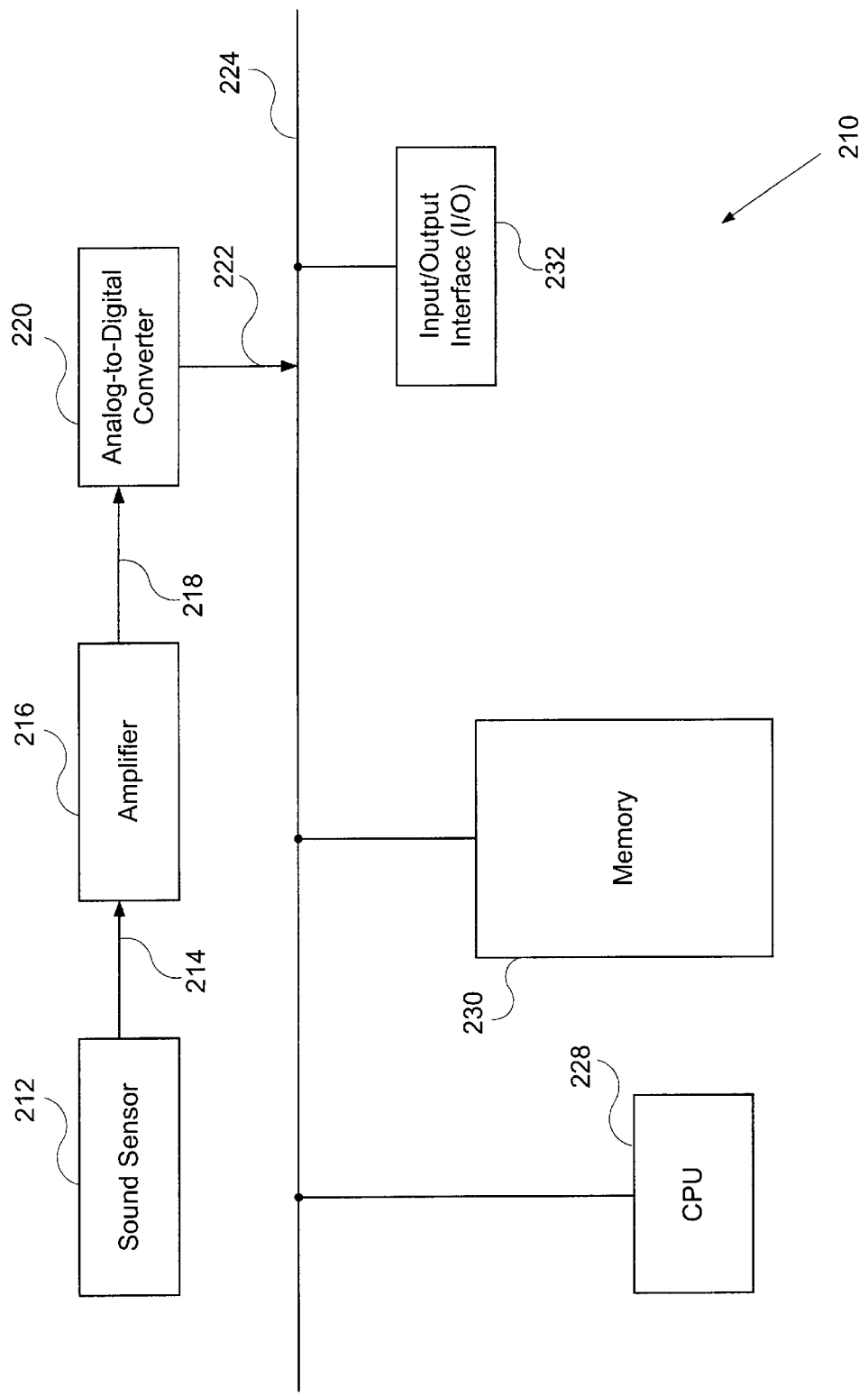
FIG. 2 is a block diagram for one embodiment of a computer system, according to the present invention.

Referring now to FIG. 2, a block diagram for one embodiment of a computer system 210 is shown, according to the present invention. The FIG. 2 embodiment includes a sound sensor 212, an amplifier 216, an analog-to-digital converter 220, a central processing unit (CPU) 228, a memory 230 and an input/output interface 232.

In operation, sound sensor 212 detects ambient sounds and converts the detected sounds into an analog sound signal that is provided to amplifier 216 via line 214. Amplifier 216 amplifies the received analog sound signal and provides an amplified analog sound signal to analog-to-digital converter 220 via line 218. Analog-to-digital converter 220 then converts the amplified analog sound signal into corresponding digital sound data and provides the digital sound data via line 222 to system bus 224.

CPU 228 may then access the digital sound data on system bus 224 and responsively analyze and process the digital sound data to perform speech recognition according to software instructions contained in memory 230. The operation of CPU 228 and the software instructions in memory 230 are further discussed below in conjunction with FIGS. 3–10. After the sound data is processed, CPU 228 may then advantageously provide the results of the speech recognition analysis to other devices (not shown) via input/output interface 232.

Figure 3:
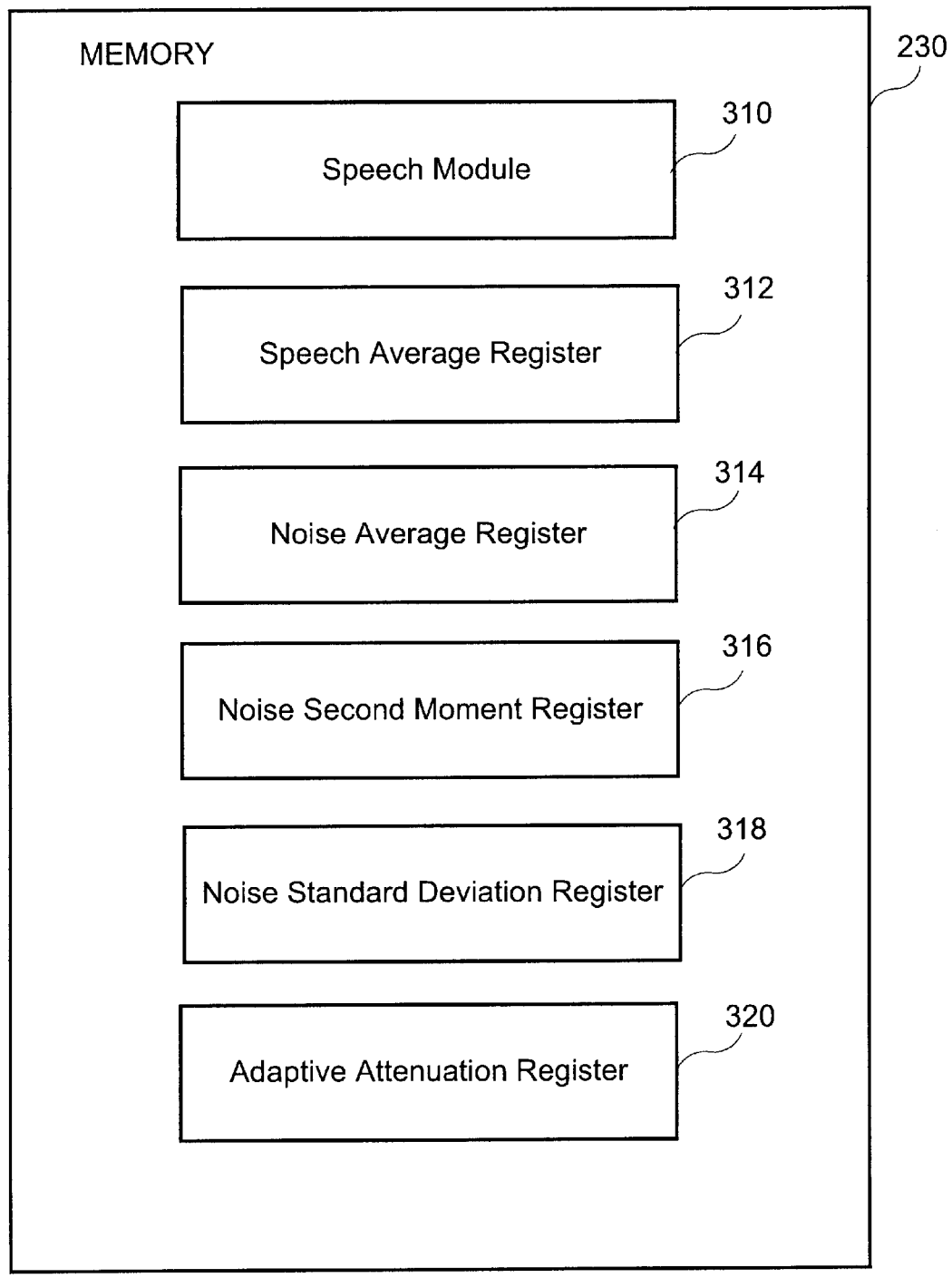
FIG. 3 is a block diagram for one embodiment of the memory of FIG. 2, according to the present invention.

Referring now to FIG. 3, a block diagram for one embodiment of memory 230 of FIG. 2 is shown. Memory 230 may alternatively comprise various storage-device configurations, including Random-Access Memory (RAM) and non-volatile storage devices such as floppy disks or hard disk drives. In the FIG. 3 embodiment, memory 230 includes a speech module 310, a speech average register 312, a noise average register 314, a noise second moment register 316, a noise standard deviation register 318, and an adaptive attenuation register 320. Memory 230 may also include various other registers and software modules.

In the FIG. 3 embodiment, speech module 310 includes a series of software modules which are executed by CPU 228 to analyze and detect speech data, and which are further described below in conjunction with FIGS. 4 through 10. In alternate embodiments, speech module 310 may readily be implemented using various other software and/or hardware configurations. Speech average register 312, noise average register 314, noise second moment register 316, noise standard deviation register 318, and adaptive attenuation register 320 contain respective variable values that are calculated and utilized by speech module 310 to attenuate noise according to the present invention. The utilization and functionality of speech average register 312, noise average register 314, noise second moment register 316, noise standard deviation register 318, and adaptive attenuation register 320 are related to a noise suppressor, as described below in conjunction with FIGS. 6 through 10.

Figure 4:
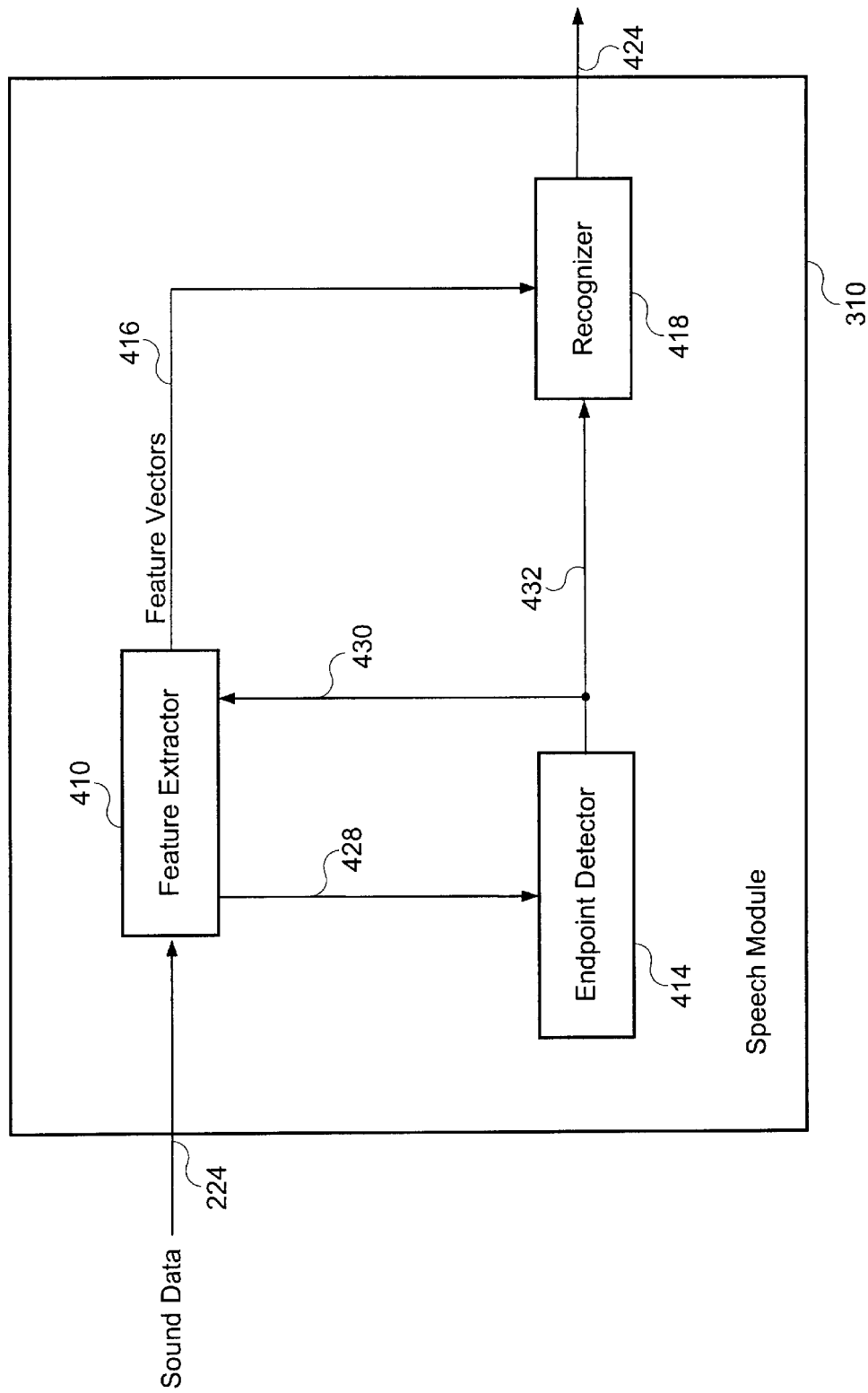
FIG. 4 is a block diagram for one embodiment of the speech module of FIG. 3, according to the present invention.

Referring now to FIG. 4, a block diagram for one embodiment of the FIG. 3 speech module 310 is shown, according to the present invention. In the FIG. 3 embodiment, speech module 310 includes a feature extractor 410, an endpoint detector 414 and a recognizer 418.

In operation, analog-to-digital converter 220 (FIG. 2) provides digital sound data to feature extractor 410 within speech module 310 via system bus 224. Feature extractor 410 responsively generates normalized feature vectors that are then provided to recognizer 418 via path 416. Endpoint detector 414 analyzes sound data received from feature extractor 410, and responsively determines endpoints (beginning and ending points) for spoken utterances represented by the sound data received via path 428. Endpoint detector 414 then provides the calculated endpoints to feature extractor 410 via path 430 and to recognizer 418 via path 432.

Recognizer 418 receives the normalized feature vectors via path 416 and the endpoints via path 432, and responsively performs a speech recognition procedure to advantageously generate a speech recognition result to CPU 228 via path 424. In the FIG. 4 embodiment, recognizer 418 may effectively be implemented as a Hidden Markov Model (HMM) recognizer.

Figure 5:
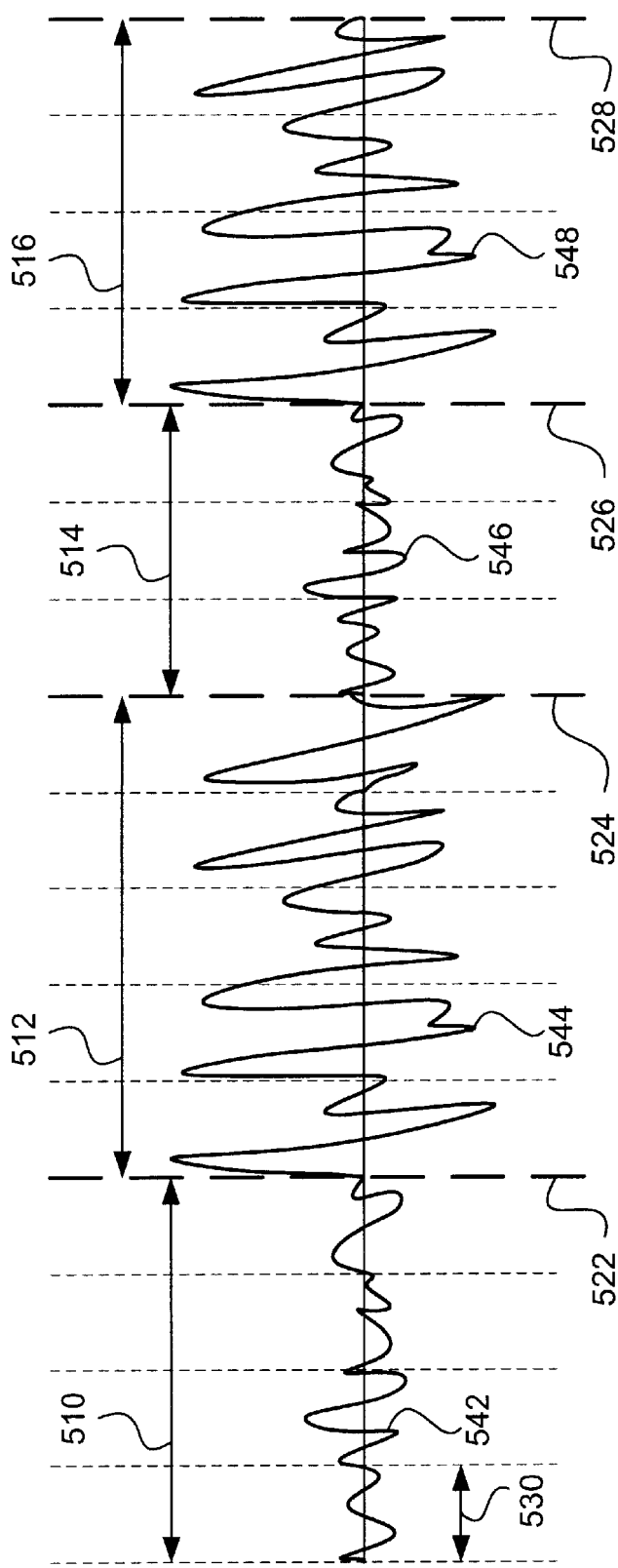
FIG. 5 is an exemplary waveform diagram for one embodiment of frames of noise and noisy speech, according to the present invention.

Referring now to FIG. 5, a diagram for one embodiment of frames of noise and noisy speech is shown, according to the present invention. Sound detected by sound sensor 212 (FIG. 2) will typically include periods of noise and periods of noisy speech. In FIG. 5, the detected sound includes noise 542, noisy speech 544, noise 546, and noisy speech 548. The detected waveform in FIG. 5 is shown for purposes of illustration only, and sound detected by the present invention may comprise various other waveforms.

Speech module 310 processes sound data in units called frames. A frame 530 contains sound data for a predetermined amount of time, typically a number of milliseconds. In FIG. 5, noise 542 includes four frames and noisy speech 544 includes five frames. The five frames of noisy speech 544 correspond to an utterance 512. Utterance 512 has an endpoint 522 and an endpoint 524, which are detected by endpoint detector 414. An utterance 516 includes four frames and has endpoints 526 and 528. The four frames of noise 542 correspond to a noise period 510, and the three frames of noise 546 correspond to a noise period 514. Other utterances and noise periods may contain different numbers of frames from those shown in FIG. 5.

Figure 6:
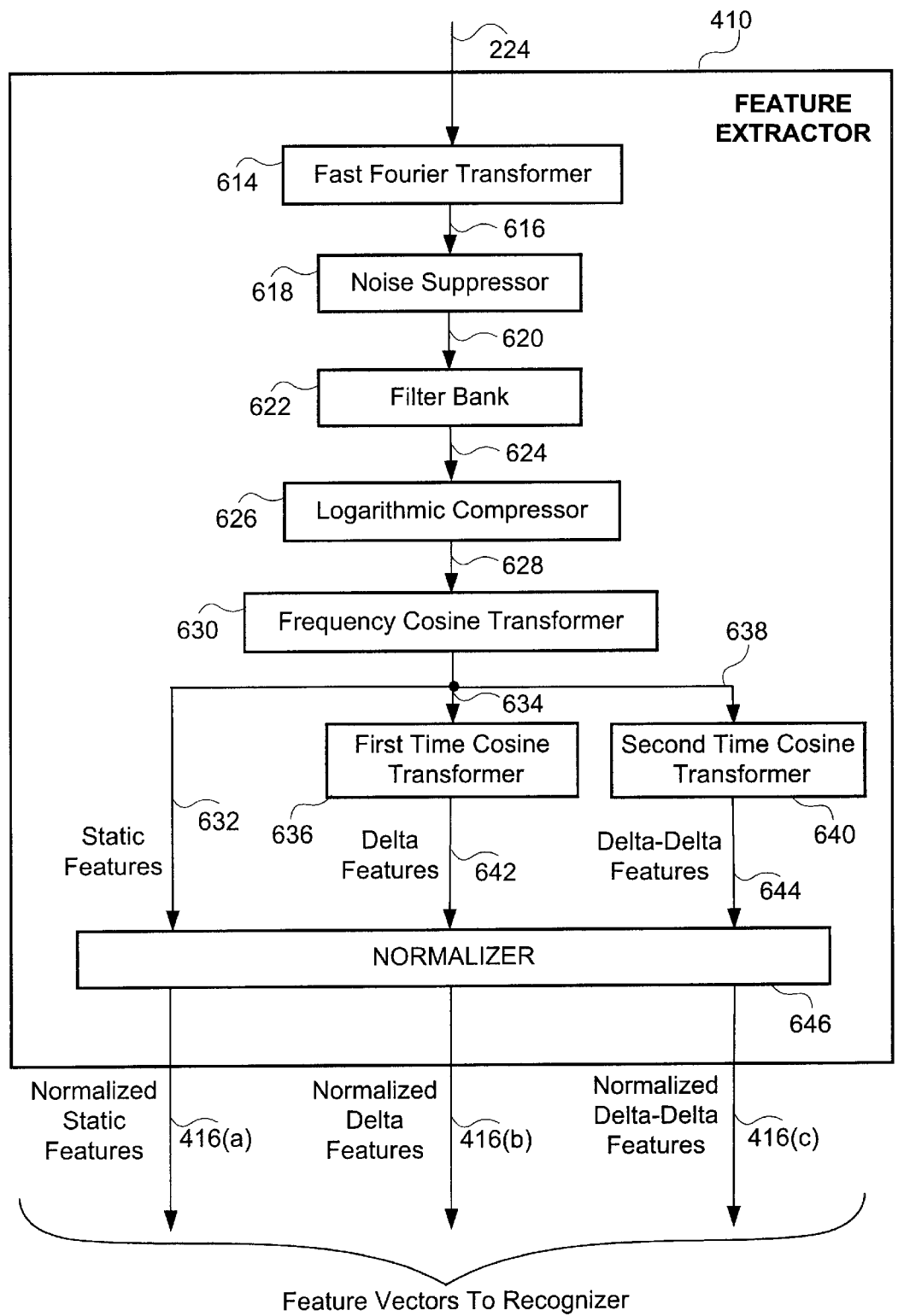
FIG. 6 is a block diagram for one embodiment of the feature extractor of FIG. 4, according to the present invention.

Referring now to FIG. 6, a block diagram for one embodiment of the FIG. 4 feature extractor 410 is shown, according to the present invention. In the FIG. 6 embodiment, feature extractor 410 includes a Fast Fourier Transformer 614, a noise suppressor 618, a filter bank 622, a logarithmic compressor 626, a frequency cosine transformer 630, a first time cosine transformer 636, a second time cosine transformer 640, and a normalizer 646. In alternate embodiments, feature extractor 410 may readily be implemented using various other appropriate configurations.

In operation, the FIG. 6 feature extractor 410 initially provides source sound data to Fast Fourier Transformer (FFT) 614 via path 224. FFT 614 responsively generates frequency-domain sound data by converting the source sound data from the time domain to the frequency domain to facilitate subsequent noise suppression. Fast Fourier transforms are discussed in "Digital Signal Processing Principles, Algorithms and Applications," by John G. Proakis and Dimitris G. Manolakis, 1992, Macmillan Publishing Company, (in particular, pages 706–708) which is hereby incorporated by reference.

FFT 614 processes sound data on a frame by frame basis, generating amplitude energy values for each frame of data. In the FIG. 6 embodiment, FFT 614 produces an amplitude energy value for each of 256 frequency indexes. The amplitude energy values may be magnitude energy values or power energy values. FFT 614 then preferably provides the generated amplitude energy values to noise suppressor 618 via path 616.

In the FIG. 6 embodiment, noise suppressor 618 preferably performs a noise suppression process for each frame of sound data. Noise suppressor 618 provides the noise-suppressed sound energy to filter bank 622 via path 620. The functionality of noise suppressor 618 is further discussed below in conjunction with FIGS. 8–10.

Filter bank 622 responsively filters the noise-suppressed sound energy into channel energy by dividing the noise-suppressed sound energy into a number of frequency sub-bands. The configuration and functionality of filter bank 622 is further discussed below in conjunction with FIG. 7. Filter bank 622 then provides the filtered channel energy to logarithmic compressor 626 via path 624. Logarithmic compressor 626 then preferably converts the filtered channel energy received from filter bank 622 into logarithmic channel energy by separately calculating the logarithm of each frequency sub-band that comprises the filtered channel energy. Logarithmic compressor 626 then provides the logarithmic channel energy to frequency cosine transformer 630 via path 628.

In the FIG. 6 embodiment, frequency cosine transformer 630 performs a linear transformation process that decorrelates the logarithmic channel energy received from logarithmic compressor 626. Adjacent channels of filter bank 622 may exhibit similar responses that result in disadvantageous correlations between sub-band energy values. Frequency cosine transform 630 preferably converts the channels (sub-bands) of received logarithmic channel energy into independent cepstral features that are compatible with an HMM recognizer such as the preferred embodiment of recognizer 418. The cepstral features preferably include a number of separate feature components.

The foregoing frequency cosine transform process and corresponding derivation of cepstral features are further discussed in the following references which are hereby incorporated by reference: "Speech Communication," by Douglas O'Shaughnessy, 1990, Addison-Wesley Publishing, (in particular, pages 422–423), and "Comparison Of Parametric Representations For Monosyllabic Word Recognition In Continuously Spoken Sentences," by S. B. Davis and Paul Mermelstein, 1980, IEEE.

Frequency cosine transformer 630 thus converts the received logarithmic channel energy into corresponding static features that are provided to normalizer 646 via path 632. Frequency cosine transformer 630 also provides the static features to first time cosine transformer 636 via path 634, and to second time cosine transformer 640 via path 638. In alternate embodiments of feature extractor 410, additional time cosine transforms may readily be utilized. For example, frequency cosine transformer 630 may provide the static features to additional time cosine transformers, in accordance with the present invention.

First time cosine transformer 636 responsively converts the received static features into delta features that are provided to normalizer 646 via path 642. Similarly, second time cosine transformer 640 converts the received static features into delta-delta features that are provided to normalizer 646 via path 644.

First time cosine transformer 636 and second time cosine transformer 640 remove the continuous component of the static cepstral features from frequency cosine transformer 630 to provide linear channel and microphone invariance to the generated delta features and delta-delta features. In a phoneme-based recognizer (like the preferred embodiment of recognizer 418) elimination of the static features may significantly degrade speech recognition accuracy. In accordance with the present invention, the time-domain cosine transform is therefore used to estimate derivative features (1st, 2nd and in some cases 3rd derivatives) in combination with the static features.

Use of first time cosine transformer 636 and second time cosine transformer 640 in adverse conditions provides more stable derivatives in mismatched conditions (unknown channels and additive noise). The time-domain cosine transform estimates derivatives on an orthogonal basis to provide more separability and stability in adverse conditions.

In one embodiment, the process performed by first time cosine transformer 636 and second time cosine transformer 640 may be expressed by the following formula:

$$\frac{\partial^o}{\partial_t} C_t(p) = \sum_{i=-M}^{M} C_{t+k}(p) \cos\left(\frac{i+M+0.5}{2M+1} o\pi\right)$$

where $C_t(p)$ is the $p^{th}$ cepstral coefficient at time frame t, o is the derivatives order (1st, 2nd derivatives . . . ) with a value of one corresponding to the delta features and a value of two corresponding to the delta-delta features, and M is half of a window analysis used to estimate the differential coefficients.

Finally, normalizer 646 performs an effective normalization process on the received static features to generate normalized static features to recognizer 418 via path 416(*a*), in accordance with the present invention. Similarly, normalizer 646 performs a normalization process on the received delta features to generate normalized delta features to recognizer 418 via path 416(*b*). Normalizer 646 also performs a normalization process on the received delta-delta features to generate normalized delta-delta features to recognizer 418 via path 416(*c*).

Figure 7:
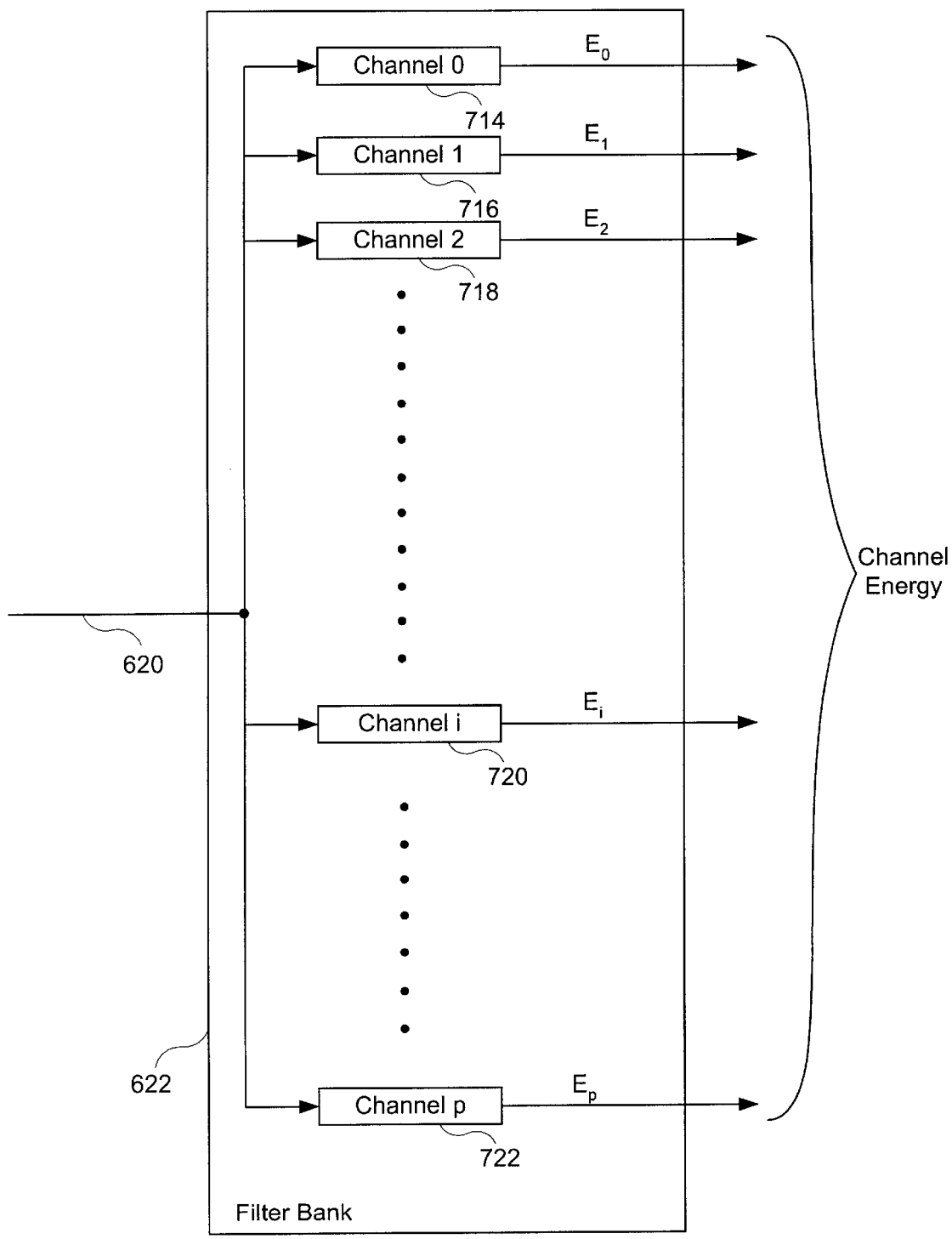
FIG. 7 is a schematic diagram for one embodiment of the filter bank of FIG. 6, according to the present invention.

Referring now to FIG. 7, a schematic diagram for one embodiment of filter bank 622 of feature extractor 410 (FIG. 4) is shown, according to the present invention. In the FIG. 7 embodiment, filter bank 622 is a mel-frequency scaled filter bank with "p" channels (channel 0 (714) through channel p (722)). In alternate embodiments, various other implementations of filter bank 622 are equally possible.

In operation, filter bank 622 receives noise-suppressed sound energy via path 620, and provides the noise-suppressed sound energy in parallel to channel 0 (714) through channel p (722). In response, channel 0 (714) through channel p (722) generate respective channel energies $E_o$ through $E_p$ which collectively form the filtered channel energy provided to logarithmic compressor 626 via path 624.

Figure 8A:
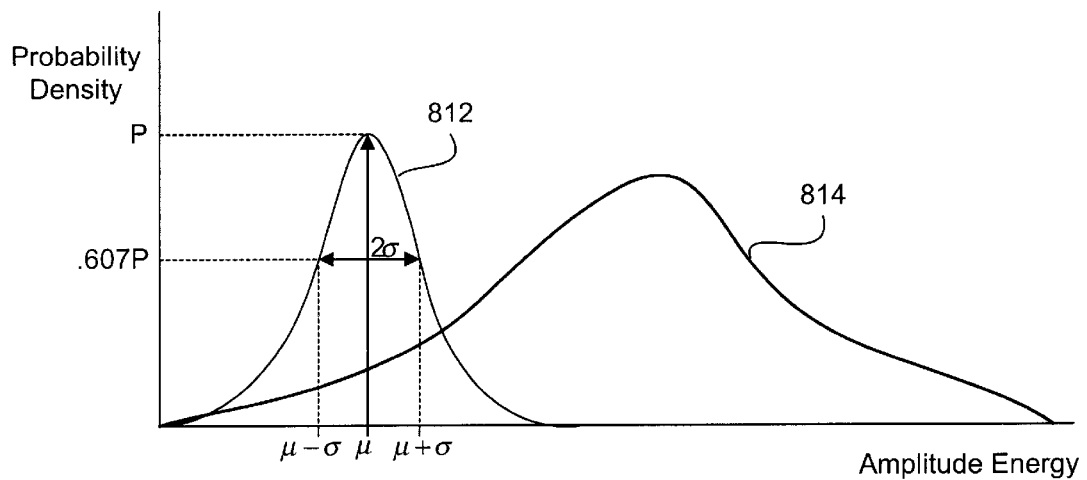
FIG. 8(a) is a diagram of a probability density of noise energy and a probability density of speech energy, according to one embodiment of the present invention.
Figure 8B:
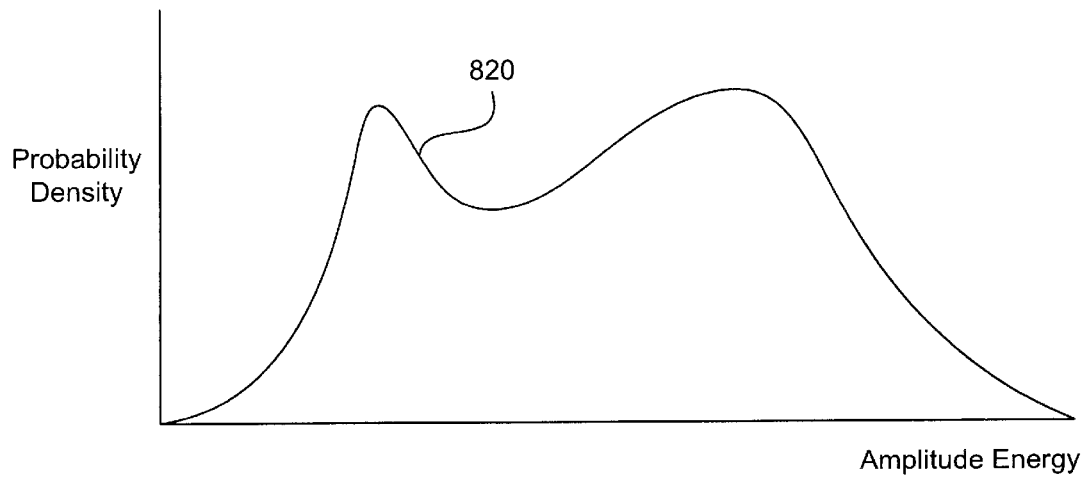
FIG. 8(b) is a diagram of a probability density of noisy speech energy, according to one embodiment of the present invention.

Referring now to FIG. 8(*a*), a diagram of an exemplary probability density of noise energy 812 and an exemplary probability density of speech energy 814 is shown, according to one embodiment of the present invention. A probability density typically represents the likelihood that a random signal, such as noise, will have a certain amplitude energy value. As shown in FIG. 8(*a*), noise density 812 is typically concentrated at low amplitude energy values and speech density 814 is typically concentrated at high amplitude energy values.

Noise density 812 is approximately Gaussian with a maximum value P at amplitude energy $\mu$. The value $\mu$ is an average of the noise amplitude values, or noise average. A noise standard deviation $\sigma$ is an indicator of the spread of noise density 812 about the noise average. The width of noise density 812 at a value 0.607 times the maximum value P is equal to two times the noise standard deviation (2$\sigma$). Additive noise from different sources will have different probability densities, each with a different noise average and noise standard deviation.

Referring now to FIG. 8(*b*), a diagram of an exemplary probability density of noisy speech energy 820 is shown, according to one embodiment of the present invention. Noisy speech density 820 occurs in situations where additive noise corrupts a speech signal. Additive noise typically affects noisy speech density 820 at low amplitude energy values. Noise suppressor 618 (FIG. 6) advantageously attenuates noisy speech density 820 such that noise is suppressed in the sound energy transmitted to filter bank 622, as described below in conjunction with FIGS. 9–11.

Figure 9A:
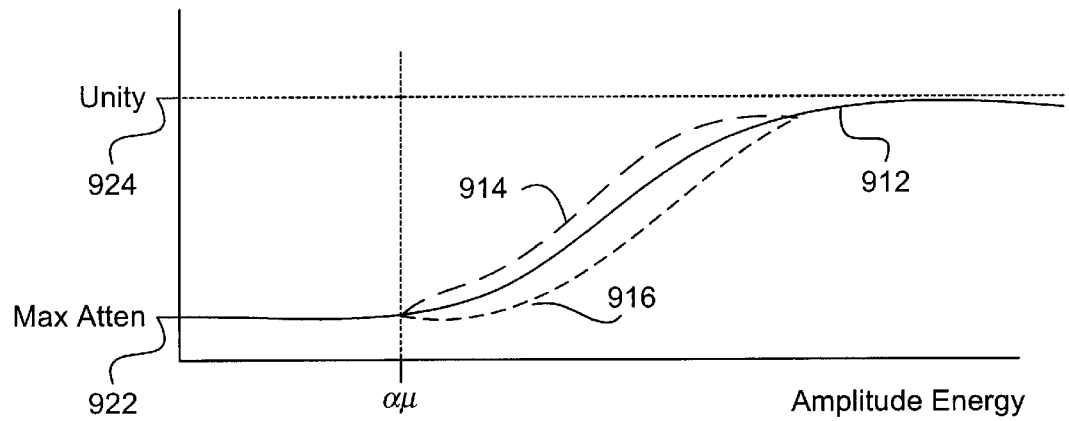
FIG. 9(a) is a diagram of an attenuation function, according to one embodiment of the present invention.
Figure 9B:
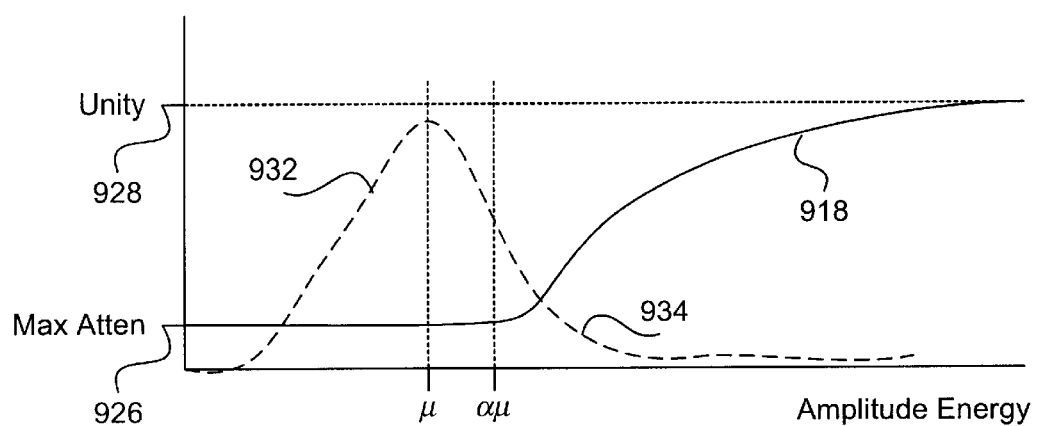
FIG. 9(b) is a diagram of a probability density of noise energy and an attenuation function, according to one embodiment of the present invention.

Referring now to FIG. 9(*a*), a diagram of an attenuation function 912 is shown, according to one embodiment of the present invention. In accordance with the present invention, noise suppressor 618 preferably reduces noise in sound energy by multiplying noisy speech energy having density 820 by attenuation function 912. The shape of attenuation function 912 depends in part on the noise average and the noise standard deviation. The noise average determines where attenuation function 912 begins to increase from the maximum attenuation (max atten) level. The noise standard deviation determines the shape of attenuation function 912 as the amplitude changes from the maximum attenuation level to unity (minimum attenuation or full transmission).

In one embodiment of the present invention, noise suppressor 618 preferably generates attenuated noisy speech energy as follows:

$$Yat_k = \frac{Y_k}{1 + A e^{-\frac{1}{2}\left(\frac{Y_k - \alpha \mu_k}{\sigma_k}\right)^2}} \quad \text{if } Y_k > \alpha \mu_k$$

$$Yat_k = \frac{Y_k}{1 + A} \quad \text{otherwise}$$

where $Yat_k$ is the attenuated noisy speech energy at frequency index k, $Y_k$ is noisy speech energy at frequency index k, $\mu_k$ is the noise average at frequency index k, $\sigma_k$ is the noise standard deviation at frequency index k, $\alpha$ is an overestimation coefficient, and A is an attenuation coefficient. Optimum values for $\alpha$ and A may be determined experimentally. In the FIG. 9(*a*) embodiment, $\alpha$ is equal to 1.3 and A is equal to 6. Noise suppressor 618 preferably generates attenuated noisy speech energy at 256 frequency indexes for each frame of noisy speech energy.

In another embodiment of the present invention, noise suppressor 618 preferably generates the attenuated noisy speech energy as follows:

$$Yat_k = \frac{Y_k}{1 + A e^{-\frac{1}{2}\left(\frac{Y_k - (\mu_k + \alpha_v \sigma_k)}{\sigma_k}\right)^2}} \quad \text{if } Y_k > \mu_k + \alpha_v \sigma_k$$

$$Yat_k = \frac{Y_k}{1 + A} \quad \text{otherwise}$$

where $Yat_k$ is the attenuated noisy speech energy at frequency index k, $Y_k$ is the noisy speech energy at frequency index k, $\mu_k$ is the noise average at frequency index k, $\sigma_k$ is the noise standard deviation at frequency index k, $\alpha_v$ is an overestimation coefficient related to the noise standard deviation, and A is an attenuation coefficient. Optimum values for $\alpha_v$ and A may be determined experimentally. In the FIG. 9(*a*) embodiment, $\alpha_v$ is equal to 0.75 and A is equal to 6. Noise suppressor 618 generates attenuated noisy speech energy at 256 frequency indexes for each frame of noisy speech energy.

In FIG. 9(*a*), the overestimation coefficient times the noise average ($\alpha\mu$) is the amplitude energy value where attenuation function 912 begins to increase from the maximum attenuation value. Other noise densities having the same noise average but different noise standard deviations may result in differently shaped attenuation functions such as functions 914 and 916.

Referring now to FIG. 9(*b*), a diagram of a probability density 932 of noise energy and an attenuation function 918 is shown, according to one embodiment of the present invention. Attenuation function 918 preferably depends on the noise average and the noise standard deviation of noise density 932. The shape of attenuation function 918 as the function increases from maximum attenuation is preferably an inverse of the shape 934 of noise density 932 as noise density 932 decreases from a maximum value.

Before generating the attenuated noisy speech energy, noise suppressor 618 preferably determines the noise average and the noise standard deviation for each frequency index k. In one embodiment, noise suppressor 618 may determine the noise average during noise periods 510 (FIG. 5) as follows:

$$\mu_k = \frac{1}{T}\sum_{t=1}^{T} N_k(t)$$

where $\mu_k$ is the noise average for frequency index k, $N_k(t)$ is noise energy for frequency index k at frame t for t equal to 1 through T, and T is the total number of frames in the noise period. Endpoint detector 414 (FIG. 4) provides endpoint data to noise suppressor 618 to indicate whether a frame is in a noise period or an utterance. Noise suppressor 618 preferably stores the noise average in noise average register 314 (FIG. 3).

Noise suppressor 618 may then determine the noise standard deviation as follows:

$$\sigma_k = \sqrt{\frac{1}{T}\sum_{t=1}^{T}(N_k(t)-\mu_k)^2}$$

where $\sigma_k$ is the noise standard deviation for frequency index k, $\mu_k$ is the noise average for frequency index k, $N_k(t)$ is the noise energy for frequency index k at frame t for t equal to 1 through T, and T is the total number of frames in the noise period. Noise suppressor 618 preferably stores the noise standard deviation in noise standard deviation register 318.

In another embodiment, noise suppressor 618 determines the noise average and the noise standard deviation recursively at each frame t. In this embodiment, noise suppressor 618 determines the noise average as follows:

$$\mu_k(t)=\beta\mu_k(t-1)+(1-\beta)N_k(t)$$

where $\mu_k(t)$ is the noise average for frequency index k at frame t, $N_k(t)$ is the noise energy for frequency index k at frame t, and $\beta$ is a noise forgetting coefficient. The noise forgetting coefficient is typically equal to 0.95.

To determine the noise standard deviation recursively, noise suppressor 618 first determines a noise second moment as follows:

$$S_k(t)=\beta S_k(t-1)+(1-\beta)N_k(t)N_k(t)$$

where $S_k(t)$ is the noise second moment for frequency index k at frame t, $N_k(t)$ is the noise energy for frequency index k at frame t, and $\beta$ is the noise forgetting coefficient. Noise suppressor 618 preferably stores the noise second moment in noise second moment register 316 (FIG. 3).

Noise suppressor 618 then determines the noise standard deviation as follows:

$$\sigma_k(t)=\sqrt{S_k(t)-\mu_k(t)\mu_k(t)}$$

where $\sigma_k(t)$ is the noise standard deviation for frequency index k at frame t, $S_k(t)$ is the noise second moment for frequency index k at frame t, and $\mu_k(t)$ is the noise average for frequency index k at frame t. Noise suppressor 618 preferably stores the noise standard deviation values in noise standard deviation register 318. Noise suppressor 618 then utilizes the noise average and the noise standard deviation to generate attenuated noisy speech energy as described above.

In a further embodiment of the present invention, the attenuation coefficient A may depend on the signal-to-noise conditions instead of being a constant. A large attenuation coefficient provides better attenuation in high noise conditions and a small attenuation coefficient provides better attenuation in low noise conditions. In addition, noise energy typically does not affect the speech energy equally at all frequencies. Thus, noise suppressor 618 may determine an adaptive attenuation coefficient for each frequency index k at each frame as follows:

$$A_k(t) = \frac{A}{\log_2\left(1+\frac{Sp_k(t)}{\alpha\mu_k(prev)}\right)} \quad t \in \text{utterance}$$

$$A_k(t) = \frac{A}{\log_2\left(1+\frac{Sp_k(prev)}{\alpha\mu_k(t)}\right)} \quad t \in \text{noise period}$$

where $A_k(t)$ is the adaptive attenuation coefficient for frequency index k at frame t, A is the attenuation coefficient, $\mu_k(t)$ is the noise average for frequency index k at frame t, $\alpha$ is the overestimation coefficient, $Sp_k(t)$ is a noisy speech average for frequency index k at frame t, $\mu_k(prev)$ is a noise average for a noise period immediately previous to a current utterance, and $Sp_k(prev)$ is a noisy speech average for an utterance immediately previous to a current noise period. Noise suppressor 618 preferably stores the adaptive attenuation coefficients in adaptive attenuation register 320 (FIG. 3).

Noise suppressor 618 determines the noise average for each frame in a noise period as described above. Noise suppressor 618 determines the noisy speech average for each frame in an utterance as follows:

$$Sp_k(t)=ySp_k(t-1)+(1-y)Y_k(t)$$

where $Sp_k(t)$ is the noisy speech average for frequency index k at frame t, $Y_k(t)$ is a noisy speech energy value for frequency index k at frame t, and y is a speech forgetting coefficient. The speech forgetting coefficient typically has a value close to 1, for instance 0.995 or 0.997. Noise suppressor 618 preferably stores the noisy speech average values in speech average register 312 (FIG. 3).

Figure 10:
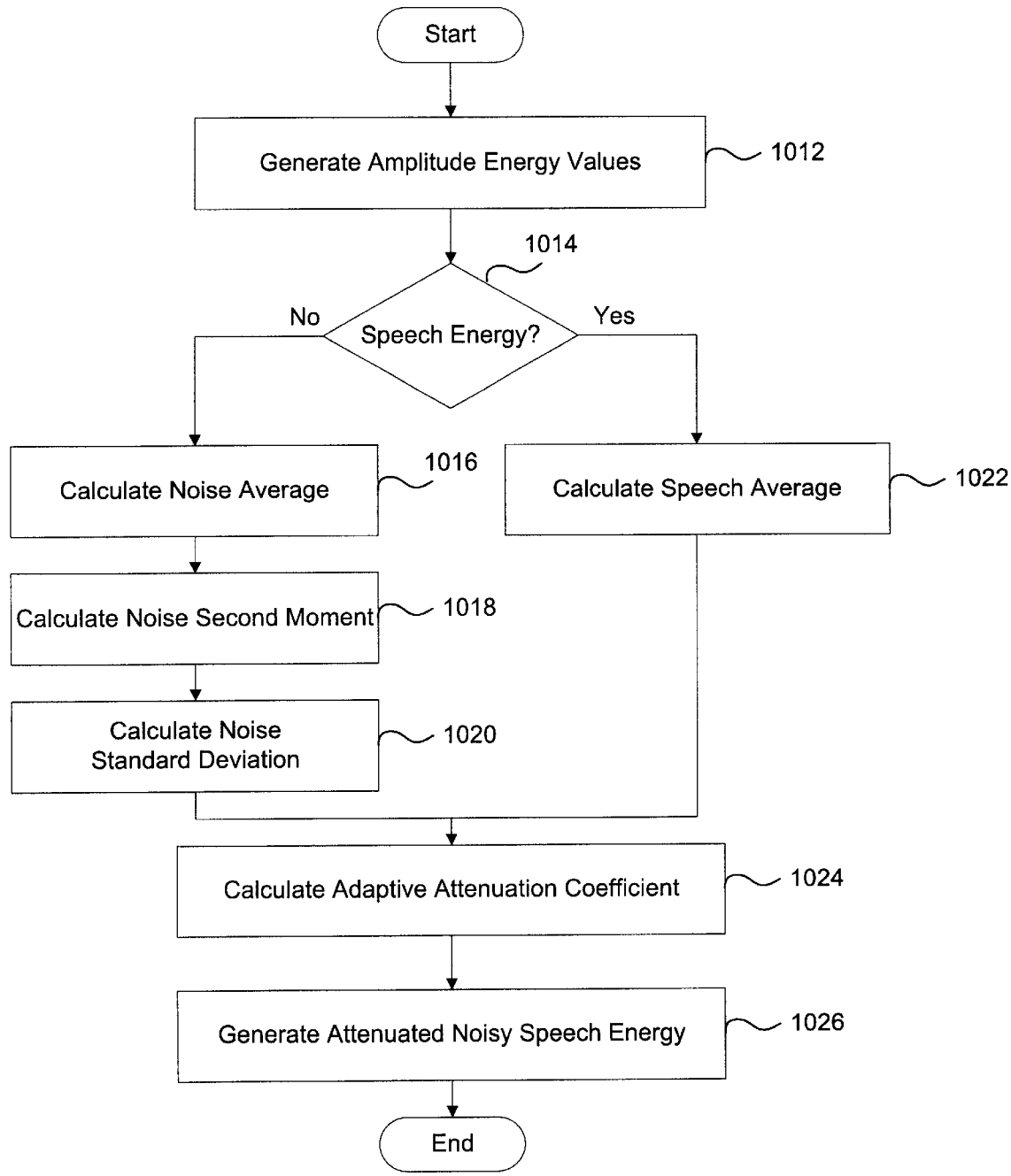
FIG. 10 is a flowchart of method steps for noise attenuation, according to one embodiment of the present invention.

Referring now to FIG. 10, a flowchart of method steps for noise attenuation of a frame of sound data is shown, according to one embodiment of the present invention. First, in step 1012, FFT 612 generates amplitude energy values for the frame of sound data. Next, in step 1014, noise suppressor 618 evaluates whether the amplitude energy values for the frame are speech energy or noise energy. Noise suppressor 618 may receive endpoint data from endpoint detector 414 to indicate the beginning and ending of an utterance.

If the amplitude energy values are speech energy, then in step 1022, noise suppressor 618 calculates a noisy speech average as described above in conjunction with FIG. 9(b). The FIG. 10 method then continues with step 1024.

However, if the amplitude energy values are noise energy, then, in step 1016, noise suppressor 618 calculates a noise average as described above in conjunction with FIG. 9(b). Next, in step 1018, noise suppressor 618 calculates a noise second moment as described above in conjunction with FIG. 9(b). In step 1020, noise suppressor 618 uses the noise average and noise second moment to calculate a noise standard deviation, as described above in conjunction with FIG. 9(b).

In step 1024, noise suppressor 618 calculates an adaptive attenuation coefficient for every frequency k for the frame of sound energy, as described above in conjunction with FIG. 9(*b*). Then, in step 1026, noise suppressor 618 generates attenuated noisy speech energy for the frame as described above in conjunction with FIG. 9(*a*). Noise suppressor 618 then provides the attenuated noisy speech energy to filter bank 622 for further processing as described above in conjunction with FIG. 6. The method steps described above are performed for consecutive frames of detected sound data. Thus the present invention effectively attenuates noise in a speech recognition system.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for noise attenuation in an electronic system, comprising:

a noise suppressor configured to selectively attenuate additive noise in an electronic signal, said electronic signal being a noisy speech signal that includes a noise signal combined with a speech signal, said noise suppressor selectively attenuating said noise signal by utilizing statistical characteristics of amplitude energy values of said noise signal, said statistical characteristics of said amplitude energy values of said noise signal include a noise average and a noise standard deviation, said noise suppressor generating an attenuated noisy speech signal according to a formula:

$$Yat_k = \frac{Y_k}{1 + Ae^{-\frac{1}{2}\left(\frac{Y_k - \alpha\mu_k}{\sigma_k}\right)^2}} \quad \text{if } Y_k > \alpha\mu_k$$

$$Yat_k = \frac{Y_k}{1 + A} \quad \text{otherwise}$$

where $Yat_k$ is said attenuated noisy speech signal for a frequency k, $Y_k$ is said noisy speech signal for said frequency k, $\mu_k$ is said noise average for said frequency k, $\sigma_k$ is said noise standard deviation for said frequency k, $\alpha$ is a overestimation coefficient, and A is an attenuation coefficient; and a processor coupled to said electronic system to control said noise suppressor.

2. The apparatus of claim 1, wherein said electronic includes a speech recognition system.

3. The apparatus of claim 2, wherein said speech recognition system is implemented in a motor vehicle.

4. The apparatus of claim 1, wherein said noise suppressor selectively attenuates said noise signal using an attenuation function that varies from a maximum attenuation to a minimum attenuation in a manner inverse to a probability density curve of said noise signal.

5. The apparatus of claim 1, wherein said attenuation coefficient includes an adaptive attenuation coefficient that is dependent on a frequency and a signal-to-noise ratio of said noisy speech signal.

6. The apparatus of claim 1, wherein said attenuation coefficient is replaced by an adaptive attenuation coefficient determined according to a formula:

$$A_k(t) = \frac{A}{\log_2\left(1 + \frac{Sp_k(t)}{\alpha\mu_k(prev)}\right)} \quad t \in \text{utterance}$$

$$A_k(t) = \frac{A}{\log_2\left(1 + \frac{Sp_k(prev)}{\alpha\mu_k(t)}\right)} \quad t \in \text{noise period}$$

where $A_k(t)$ is said adaptive attenuation coefficient for a frequency index k at a frame t, A is said attenuation coefficient, $\alpha$ is said overestimation coefficient, $\mu_k(t)$ is said noise average for frequency index k at frame t, $Sp_k(t)$ is a noisy speech average for frequency index k at frame t, $\mu_k(prev)$ is a noise average for a noise period immediately previous to a current utterance, and $Sp_k(prev)$ is a noisy speech average for an utterance immediately previous to a current noise period.

7. The apparatus of claim 6, wherein said noise suppressor calculates said noisy speech average according to a formula:

$$Sp_k(t) = ySp_k(t-1) + (1-y)Y_k(t)$$

where $Sp_k(t)$ is said noisy speech average for frequency index k at frame t, $Y_k(t)$ is a noisy speech amplitude energy value for frequency index k at frame t, and y is a speech forgetting coefficient.

8. The apparatus of claim 1, wherein said noise suppressor determines a noise average and a noise standard deviation of said energy amplitude values of said noise signal, utilizes said noise average and said noise standard deviation to identify selected ones of said amplitude energy values of said noisy speech signal that have a probability of containing noise, and selectively attenuates said amplitude energy values of said noisy speech signal according to said probability.

9. The apparatus of claim 1, wherein said noise suppressor calculates said noise average according to a formula:

$$\mu_k = \frac{1}{T}\sum_{t=1}^{T} N_k(t)$$

where $\mu_k$ is said noise average for a frequency index k, $N_k(t)$ is a noise energy amplitude value for frequency index k at a frame t for t equal to 1 through T, and T is a total number of frames in a noise period.

10. The apparatus of claim 9, wherein said noise suppressor calculates said noise standard deviation according to a formula:

$$\sigma_k = \sqrt{\frac{1}{T}\sum_{t=1}^{T}(N_k(t) - \mu_k)^2}$$

where $\sigma_k$ is said noise standard deviation for frequency index k, $\mu_k$ is said noise average for frequency index k, $N_k(t)$ is said noise energy amplitude value for frequency index k at said frame t for t equal to 1 through T, and T is said total number of frames in said noise period.

11. An apparatus for noise attenuation in an electronic system, comprising:

a noise suppressor configured to selectively attenuate additive noise in an electronic signal, said electronic signal being a noisy speech signal that includes a noise signal combined with a speech signal, said noise suppressor selective attenuating said noise signal by utilizing statistical characteristics of amplitude energy values of said noise signal, said statistical characteristics of said amplitude energy values of said noise signal include a noise average and a noise standard deviation, said noise suppressor generating an attenuated noisy speech signal according to a formula:

$$A_k(t) = \frac{A}{\log_2\left(1 + \frac{Sp_k(t)}{\alpha\mu_k(prev)}\right)} \quad t \in \text{utterance}$$

$$A_k(t) = \frac{A}{\log_2\left(1 + \frac{Sp_k(prev)}{\alpha\mu_k(t)}\right)} \quad t \in \text{noise period}$$

where $\text{Yat}_k$ is said attenuated noisy speech signal for a frequency k, $Y_k$ is said noisy speech signal for said frequency k, $\mu_k$ is said noise average for said frequency k, $\sigma_k$ is said noise standard deviation for said frequency k, $\alpha_v$ is an overestimation coefficient related to said noise standard deviation, and A is an attenuation coefficient; and a processor coupled to said electronic system to control said noise suppressor.

12. An apparatus for noise attenuation in an electronic system, comprising:

a noise suppressor configured to selectively attenuate additive noise in an electronic signal, said electronic signal being a noisy speech signal that includes a noise signal combined with a speech signal, said noise suppressor selectively attenuating said noise signal by utilizing statistical characteristics of amplitude energy values of said noise signal, said statistical characteristics of said amplitude energy values of said noise signal include a noise average and a noise standard deviation, said noise suppressor calculating said noise average according to a formula:

$$\mu_k(t)=\beta\mu_k(t-1)+(1-\beta)N_k(t)$$

where $\mu_k(t)$ is said noise average for a frequency index k at a frame t, $N_k(t)$ is a noise energy amplitude value for frequency index k at frame t, and $\beta$ is a noise forgetting coefficient; and a processor coupled to said electronic system to control said noise suppressor.

13. The apparatus of claim 12, wherein said noise suppressor calculates a noise second moment according to a formula:

$$S_k(t)=\beta S_k(t-1)+(1-\beta)N_k(t)N_k(t)$$

where $S_k(t)$ is said noise second moment for frequency index k at frame t, $N_k(t)$ is said noise energy amplitude value for frequency index k at frame t, and $\beta$ is said noise forgetting coefficient.

14. The apparatus of claim 13, wherein said noise suppressor calculates said noise standard deviation according to a formula:

$$\sigma_k(t)=\sqrt{S_k(t)-\mu_k(t)\mu_k(t)}$$

where $\sigma_k(t)$ is said noise standard deviation for frequency index k at frame t, $S_k(t)$ is said noise second moment for frequency index k at frame t, and $\mu_k(t)$ is said noise average for frequency index k at frame t.

15. A method for noise attenuation in an electronic system, comprising the steps of:

selectively attenuating additive noise in an electronic signal using a noise suppressor, said electronic signal being a noisy speech signal that includes a noise signal combined with a speech signal, said noise suppressor selectively attenuating said noise signal by utilizing statistical characteristics of amplitude energy values of said noise signal, said statistical characteristics of said amplitude energy values of said noise signal include a noise average and a noise standard deviation, said noise suppressor generating an attenuated noisy speech signal according to a formula:

$$Yat_k = \frac{Y_k}{1 + Ae^{-\frac{1}{2}\left(\frac{Y_k-\alpha\mu_k}{\sigma_k}\right)^2}} \quad \text{if } Y_k > \alpha\mu_k$$

$$Yat_k = \frac{Y_k}{1 + A} \quad \text{otherwise}$$

where $\text{Yat}_k$ said attenuated noisy speech for signal for a frequency k, $Y_k$ is said noisy speech signal for said frequency k, $\mu_k$ is said noise average for said frequency k, $\sigma_k$ is said noise standard deviation for said frequency k, $\alpha$ is a overestimation coefficient, and A is an attenuation coefficient; and controlling said noise suppressor with a processor coupled to said electronic system.

16. The method of claim 15, wherein said electronic includes a speech recognition system.

17. The method of claim 16, wherein said speech recognition system is implemented in a motor vehicle.

18. The method of claim 15, wherein said noise suppressor selectively attenuates said noise signal using an attenuation function that varies from a maximum attenuation to a minimum attenuation in a manner inverse to a probability density curve of said noise signal.

19. The method of claim 15, wherein said attenuation coefficient includes an adaptive attenuation coefficient that is dependent on a frequency and a signal-to-noise ratio of said noisy speech signal.

20. The method of claim 15, wherein said attenuation coefficient is replaced by an adaptive attenuation coefficient determined according to a formula:

$$A_k(t) = \frac{A}{\log_2\left(1 + \frac{Sp_k(t)}{\alpha\mu_k(prev)}\right)} \quad t \in \text{utterance}$$

$$A_k(t) = \frac{A}{\log_2\left(1 + \frac{Sp_k(prev)}{\alpha\mu_k(t)}\right)} \quad t \in \text{noise period}$$

where $A_k(t)$ is said adaptive attenuation coefficient for a frequency index k at a frame t, A is said attenuation coefficient, $\alpha$ is said overestimation coefficient, $\mu_k(t)$ is said noise average for frequency index k at frame t, $Sp_k(t)$ is a noisy speech average for frequency index k at frame t, $\mu_k(prev)$ is a noise average for a noise period immediately previous to a current utterance, and $Sp_k(prev)$ is a noisy speech average for an utterance immediately previous to a current noise period.

21. The method of claim 20, wherein said noise suppressor calculates said noisy speech average according to a formula:

$$Sp_k(t)=ySp_k(t-1)+(1-y)Y_k(t)$$

where $Sp_k(t)$ is said noisy speech average for frequency index k at frame t, $Y_k(t)$ is a noisy speech amplitude energy value for frequency index k at frame t, and y is a speech forgetting coefficient.

22. The method of claim 15, wherein said noise suppressor determines a noise average and a noise standard deviation of said energy amplitude values of said noise signal, utilizes said noise average and said noise standard deviation to identify selected ones of said amplitude energy values of said noisy speech signal that have a probability of containing noise, and selectively attenuates said amplitude energy values of said noisy speech signal according to said probability.

23. The method of claim 15, wherein said noise suppressor calculates said noise average according to a formula:

$$\mu_k = \frac{1}{T}\sum_{t=1}^{T} N_k(t)$$

where $\mu_k$ is said noise average for a frequency index k, $N_k(t)$ is a noise energy amplitude value for frequency index k at a frame t for t equal to 1 through T, and T is a total number of frames in a noise period.

24. The method of claim 23, wherein said noise suppressor calculates said noise standard deviation according to a formula:

$$\sigma_k = \sqrt{\frac{1}{T}\sum_{t=1}^{T}(N_k(t)-\mu_k)^2}$$

where $\sigma_k$ is said noise standard deviation for frequency index k, $\mu_k$ is said noise average for frequency index k, $N_k(t)$ is said noise energy amplitude value for frequency index k at said frame t for t equal to 1 through T, and T is said total number of frames in said noise period.

25. The method of claim 15, further comprising the step of generating amplitude energy values of said noisy speech signal using a Fast Fourier transformer.

26. The method of claim 25, further comprising the steps of providing attenuated noisy speech amplitude energy values to a filter bank, and generating channel energies using said filter bank.

27. The method of claim 26, further comprising the step of converting said channel energies into logarithmic channel energies using a logarithmic compressor.

28. The method of claim 27, further comprising the step of converting said logarithmic channel energies into corresponding static features using a frequency cosine transformer.

29. The method of claim 28, further comprising the step of providing said corresponding static features to a normalizer, a first cosine transformer, and a second cosine transformer.

30. The method of claim 29, further comprising the steps of converting said corresponding static features into delta features using said first cosine transformer, converting said corresponding static features into delta-delta features using said second cosine transformer, and providing said delta features and said delta-delta features to said normalizer.

31. The method of claim 30, further comprising the step of normalizing said static features, said delta features, and said delta-delta features using said normalizer to produce normalized static features, normalized delta features, and normalized delta-delta features.

32. The method of claim 31, further comprising the step of analyzing said normalized static features, said normalized delta features, and said normalized delta-delta features using a recognizer to produce a speech recognition result.

33. A method for noise attenuation in an electronic system, comprising the steps of:

selectively attenuating additive noise in an electronic signal using a noise suppressor, said electronic signal being a noisy speech signal that includes a noise signal combined with a speech signal, said noise suppressor selectively attenuating said noise signal by utilizing statistical characteristics of amplitude energy values of said noise signal, said statistical characteristics of said amplitude energy values of said noise signal include a noise average and a noise standard deviation, said noise suppressor generating an attenuated noisy speech signal according to a formula:

$$Yat_k = \frac{Y_k}{1+A_e^{-\frac{1}{2}\left(\frac{Y_k-(\mu_k+\alpha_v\sigma_k)}{\sigma_k}\right)^2}} \quad \text{if } Y_k > \mu_k + \alpha_v\sigma_k$$

$$Yat_k = \frac{Y_k}{1+A} \quad \text{otherwise}$$

where $Yat_k$ is said attenuated noisy speech signal for a frequency k, $Y_k$ is said noisy speech signal for said frequency k, $\mu_k$ is said noise average for said frequency k, $\sigma_k$ is said noise standard deviation for said frequency k, $\alpha_v$ is an overestimation coefficient related to said noise standard deviation, and A is an attenuation coefficient; and controlling said noise suppressor with a processor coupled to said electronic system.

34. A method for noise attenuation in an electronic system, comprising the steps of:

selectively attenuating additive noise in an electronic signal using a noise suppressor, said electronic signal being a noisy speech signal that includes a noise signal combined with a speech signal, said noise suppressor selectively attenuating said noise signal by utilizing statistical characteristics of amplitude energy values of said noise signal, said statistical characteristics of said amplitude energy values of said noise signal include a noise average and a noise standard deviation, said noise suppressor calculating said noise average according to a formula:

$$\mu_k(t)=\beta\mu_k(t-1)+(1-\beta)N_k(t)$$

where $\mu_k(t)$ is said noise average for a frequency index k at a frame t, $N_k(t)$ is a noise energy amplitude value for frequency index k at frame t, and $\beta$ is a noise forgetting coefficient; and controlling said noise suppressor with a processor coupled to said electronic system.

35. The method of claim 34, wherein said noise suppressor calculates a noise second moment according to a formula:

$$S_k(t)=\beta S_k(t-1)+(1-\beta)N_k(t)N_k(t)$$

where $S_k(t)$ is said noise second moment for frequency index k at frame t, $N_k(t)$ is said noise energy amplitude value for frequency index k at frame t, and $\beta$ is said noise forgetting coefficient.

36. The method of claim 35, wherein said noise suppressor calculates said noise standard deviation according to a formula:

$$\sigma_k(t)=\sqrt{S_k(t)-\mu_k(t)\mu_k(t)}$$

where $\sigma_k(t)$ is noise standard deviation for frequency index k at frame t, $S_k(t)$ is said noise second moment for frequency index k at frame t, and $\mu_k(t)$ is said noise average for frequency index k at frame t.

37. An apparatus for noise attenuation in an electronic system, comprising:
   a noise suppressor configured to selectively attenuate additive noise in an electronic signal, said noise suppressor determining a noise average and a noise standard deviation of energy amplitude values of a noisy speech signal, said noise suppressor utilizing said noise average and said noise standard deviation to identify said amplitude energy values of said noisy speech signal that have a statistical probability of containing said additive noise, said noise suppressor selectively attenuating said amplitude energy values of said noisy speech signal according to said statistical probability, said noise suppressor calculating said noise average according to a formula:

$$\mu_k(t) = \beta \mu_k(t-1) + (1-\beta) N_k(t)$$

where $\mu_k(t)$ is said noise average for a frequency index k at a frame t, $N_k(t)$ is a noise energy amplitude value for frequency index k at frame t, and $\beta$ is a noise forgetting coefficient; and a processor coupled to said electronic system to control said noise suppressor.

38. The apparatus of claim 37, wherein said noise suppressor calculates a noise second moment according to a formula:

$$S_k(t) = \beta S_k(t-1) + (1-\beta) N_k(t) N_k(t)$$

where $S_k(t)$ is said noise second moment for frequency index k at frame t, $N_k(t)$ is said noise energy amplitude value for frequency index k at frame t, and $\beta$ is said noise forgetting coefficient.

39. The apparatus of claim 38, wherein said noise suppressor calculates said noise standard deviation according to a formula:

$$\sigma_k(t) = \sqrt{S_k(t) - \mu_k(t) \mu_k(t)}$$

where $\sigma_k(t)$ is said noise standard deviation for frequency index k at frame t, $S_k(t)$ is noise second moment for frequency index k at frame t, and $\mu_k(t)$ is said noise rage for frequency index k at frame t.

* * * * *